United States Patent
Fey et al.

(10) Patent No.: US 7,047,119 B2
(45) Date of Patent: May 16, 2006

(54) CIRCUIT ARRANGEMENT AND METHOD FOR MEASURING CURRENT IN VEHICLE BRAKING SYSTEMS

(75) Inventors: Wolfgang Fey, Niedernhausen (DE); Mario Engelmann, Steinbach/Ts. (DE); Peter Oehler, Frankfurt-Höchst (DE)

(73) Assignee: Continental Teves AG & Co., oHG, Frankfurt (DE)

( * ) Notice: Subject to any disclaimer, the term of this patent is extended or adjusted under 35 U.S.C. 154(b) by 279 days.

(21) Appl. No.: 10/470,355

(22) PCT Filed: Dec. 19, 2001

(86) PCT No.: PCT/EP01/15040

§ 371 (c)(1),
(2), (4) Date: Jul. 23, 2003

(87) PCT Pub. No.: WO02/058967

PCT Pub. Date: Aug. 1, 2002

(65) Prior Publication Data

US 2004/0078132 A1    Apr. 22, 2004

(30) Foreign Application Priority Data

Jan. 23, 2001  (DE) ................................ 101 02 947

(51) Int. Cl.
*B60L 1/00* (2006.01)

(52) U.S. Cl. ........................... 701/70; 307/9.1; 324/607
(58) Field of Classification Search .................. 701/70; 370/212; 324/607, 609

See application file for complete search history.

(56) References Cited

U.S. PATENT DOCUMENTS

| | | | | |
|---|---|---|---|---|
| 4,090,115 A | * | 5/1978 | Franz, Jr. ..................... | 388/811 |
| 4,500,820 A | * | 2/1985 | Noto et al. ................. | 318/139 |
| 4,580,083 A | * | 4/1986 | Omae et al. ................ | 388/801 |
| 5,539,320 A | | 7/1996 | Vetter et al. | |
| 5,625,299 A | | 4/1997 | Uhling et al. | |
| 5,861,683 A | | 1/1999 | Engel et al. | |
| 6,333,940 B1 | * | 12/2001 | Baydar et al. .............. | 370/506 |

FOREIGN PATENT DOCUMENTS

| | | |
|---|---|---|
| DE | 3842921 | 6/1990 |
| EP | 0095041 | 11/1983 |
| EP | 0242640 | 10/1987 |
| EP | 0315597 | 5/1989 |

\* cited by examiner

*Primary Examiner*—Thomas G. Black
*Assistant Examiner*—Christine M. Behncke

(57) ABSTRACT

The present invention relates to a circuit arrangement for controlling the current in loads by modulation of the pulse width, comprising at least two driver stages (10) provided for the actuation of the loads, and one or more current measuring devices (3), and at least one multiplexer (4) conducting current measurement signals by way of the load current in the driver stages to one or more current measuring devices in dependence on one or more control signals (30, 31) for the multiplexer, said control signals being produced by a checking device (5). The invention further describes a method wherein the moment of the current measurements is controlled by an organized chronological order.

10 Claims, 4 Drawing Sheets a)

b)

CIRCUIT ARRANGEMENT AND METHOD FOR MEASURING CURRENT IN VEHICLE BRAKING SYSTEMS

The present invention relates to a circuit arrangement according to the preamble of claim 1, a method according to the preamble of claim 6, and the use of the circuit arrangement of the invention in brake force or driving dynamics controllers for automotive vehicles.

Electronic control units for automotive vehicle braking systems at an increasing rate perform functions that either contribute to driving safety or recently even comprise basic vehicle functions such as the braking function as such. Examples for functions for improving driving safety are anti-lock control (ABS) or driving dynamics control (ESP: Electronic Stability Program). In novel electronic braking systems like the Electrohydraulic Brake (EHB) or the Electro-mechanic Brake (EMB) the electronic control unit of the brake also performs the braking function as such.

Still higher demands are therefore placed on reliability, failure tolerance and failure treatment of the electronic control units.

It is known in prior art to arrange for safety devices in electronic control units for automotive vehicle braking systems that permit detecting any occurring defects in the electronic components incorporated therein. Upon detection of a defect of this type, appropriate countermeasures such as disconnection of the control unit or change-over of the control unit to an emergency mode may be taken. Safety-relevant circuit components may have a double or multiple (redundant) design for detecting defects. By comparing the function of the multiply provided circuit components, it is possible to detect failure in many cases.

Semiconductor components such as power field effect transistors (Power-MOSFETs, FETs), among others for actuating the electro-mechanic hydraulic valves that are provided to control the braking pressure are employed in electronic controllers. In this arrangement, the hydraulic pressure can be controlled using a pulse-width modulated driver stage that comprises at least one of the above-mentioned semiconductor components (PWM-control).

In a pulse-width modulated control of a current that utilizes a digital controller it is necessary to measure the current at determined moments by way of an analog/digital converter ((A/D converter). If it is desired to operate several pulse-width modulated drivers of this type at the same time, one A/D converter per pulse-width-modulated stage is arranged for. This procedure is e.g. disadvantageous because it is difficult to realize, entailing high costs especially in large-scale production, and because an A/D converter is required for a short time only, mostly only for a fraction of the time available. With duration of an A/D conversion of 5 μs and a frequency of pulse width modulation of 4 kHz, for example, the A/D converter would only be used to capacity of 2%.

An object of the present invention is to overcome these drawbacks.

The invention discloses the circuit arrangement according to claim 1.

According to the invention, the current values of several pulse-width-modulated driver stages are preferably measured by means of a number of current measuring devices for the individual control of the load current that is reduced compared to the number of the pulse-width-modulated driver stages.

The driver stages preferably provided to actuate inductive loads such as coils may comprise one or more semiconductor switching elements such as field effect transistors (FETs), sense-FETs, etc. The loads are valve coils of electromagnetic actuating valves for hydraulic braking systems in a particularly preferred feature.

It is preferred that the current measuring device is essentially an A/D converter. Most favorably one single A/D converter is employed for several pulse-width-modulated stages.

It is possible that the A/D converter also processes further channels being converted, if these are not critical in terms of time. It has shown that the sequence and/or the moment of the current measurement for the individual pulse-width-modulated stages must be organized by the circuit arrangement of the invention. It must be ensured in this respect that no current measurement is omitted what could lead to an unstable control, and that inaccuracies that could be caused by the organization will lead to errors of measurement in the current measurement to a smallest possible extent only.

The mode of function of a sense-FET that can preferably be implemented in the driver stage is e.g. disclosed in U.S. Pat. No. 5,079,456 or German patent application DE 195 20 735 A1. Accordingly, the load current of a power FET can be sensed because a similar FET whose surface is smaller is connected in parallel in close adjacency to the power FET on the semiconductor material. The current flowing through the smaller FET is largely proportional to the load current of the power FET, however, said current is smaller than the load current by a structurally determined numerical ratio that basically corresponds to the ratio of consumed chip surface between the power-FET and sense-FET.

A checking device is provided in the circuit arrangement for the organization of the current measurements. Said checking device controls the allocation of the input of the A/D converter to the current measuring devices of the driver stages, when requested.

The circuit arrangement of the invention preferably represents a construction unit, in particular a semiconductor chip, on which the current measuring device, the device for reducing the measuring channels, the final stages, and the A/D converter are grouped.

The present invention also relates to a method according to claim 6.

The moment of the current measurements is controlled by an organized chronological order according to the invention.

In a first preferred embodiment, the organization is favorably effected such that an exclusive highest priority is allocated alternatingly to each driver stage in a predetermined chronological order.

Processing the request is carried out depending on the situation, in particular according to the following steps:
A) First the A/D converter always processes the request of the driver stage with the instantaneously highest priority.
B) After step A) is terminated, a check is made whether further unprocessed requests are prevailing in a memory (e.g. a queue).
C) When the result of the check in step B) is positive, one of the stored requests is processed.
D) When the result of the check in step B) is negative, a request for A/D conversion can be executed, if necessary, which does not originate from a driver stage.

According to the first preferred embodiment, the memory is organized as a queue so that a request that is received earlier is always processed before a request that is received later (first-come-first-serve).

According to a second preferred embodiment for the organization of the current measurements, the memory content is executed in chronological order taking into consideration how much time is left for processing an individual request. Among others, this feature takes the fact into account that normally the possible time of measurement is limited due to a finite length of the actuating pulses. Consequently, processing stored requests according to this embodiment takes place in an order that considers the point of time of the edge of the actuating pulses. To this end, especially the requests of driver stages are sorted in the chronological order of their values for the current duty cycle (dc) and processed in this order. It is especially favorable that sorting is carried out in a chronological order, according to which the request with the smallest value for the duty cycle is always executed as first. Organizing the current measurements according to the embodiment described herein will favorably obviate the need for the step indicated hereinabove, according to which highest priority is always given to the stage with the current time slice.

As indicated already, a request for A/D conversion may be processed which does not originate from the driver stages if the memory is empty and there is still sufficient time within the instantaneous time slice. Further, it may be expedient that the remaining time is used to execute the A/D channels in a predetermined order.

The circuit arrangement of the invention may be used in an especially advantageous manner in electronic control units for automotive vehicle braking and control systems, in particular in so-called integrated brake systems, wherein the electronic control unit (ECU) is grouped with a hydraulic control unit (valve block, HCU) to form a monolithic block.

The demands placed on a current measuring device for measuring the current on several pulse-width-modulated driver stages will be described in detail in the following.

Further preferred embodiments of the invention become apparent from the sub claims and the subsequent description of Figures containing an embodiment for the invention.

In the accompanying drawings.

Figure 1:
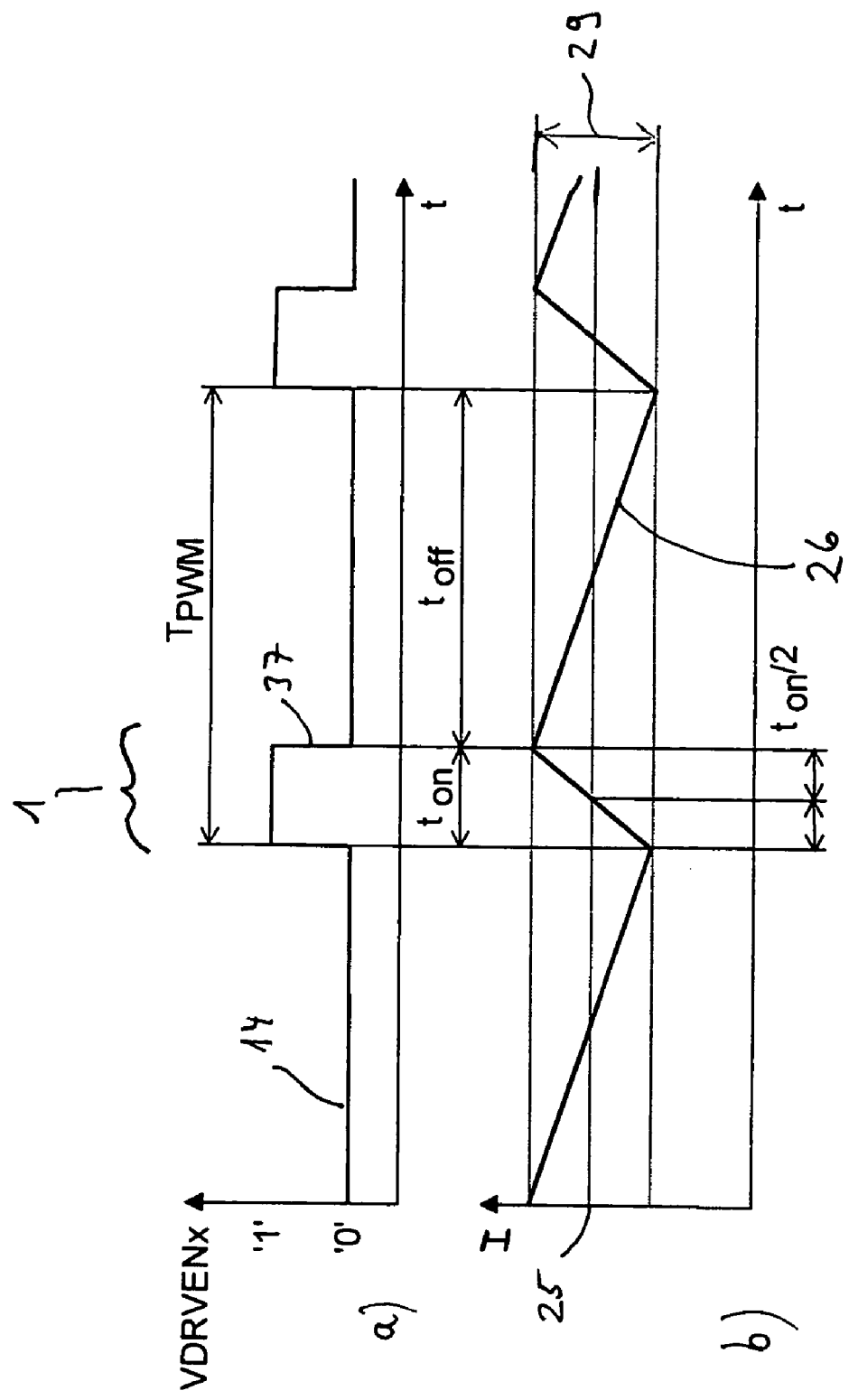
FIG. 1 shows the signal variation for a pulse-width modulated control in the transient condition.
Figure 2:
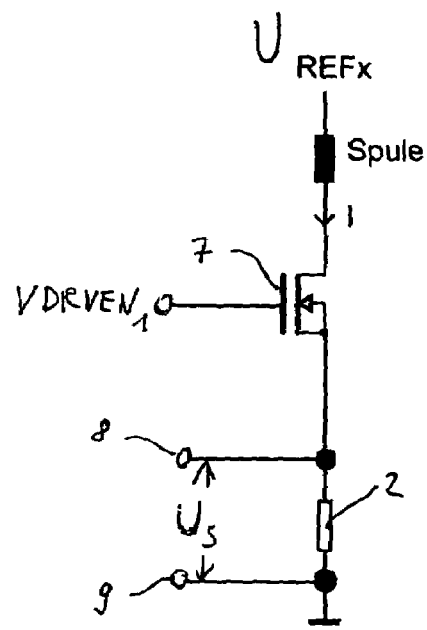
FIG. 2 shows diagrams for current measuring devices for the current measurement in a low-side driver.
Figure 2:
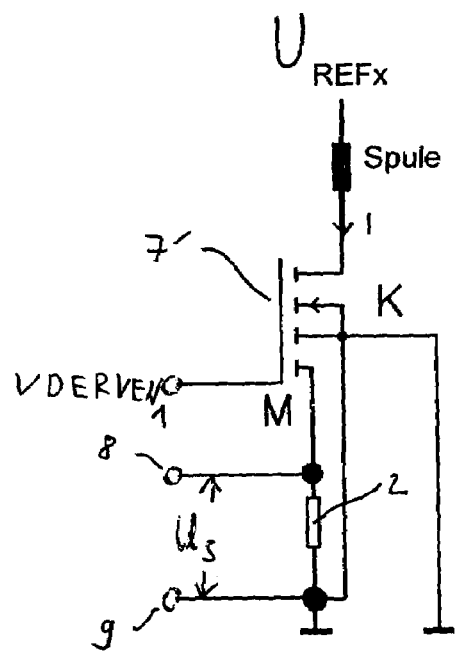
Figure 3:
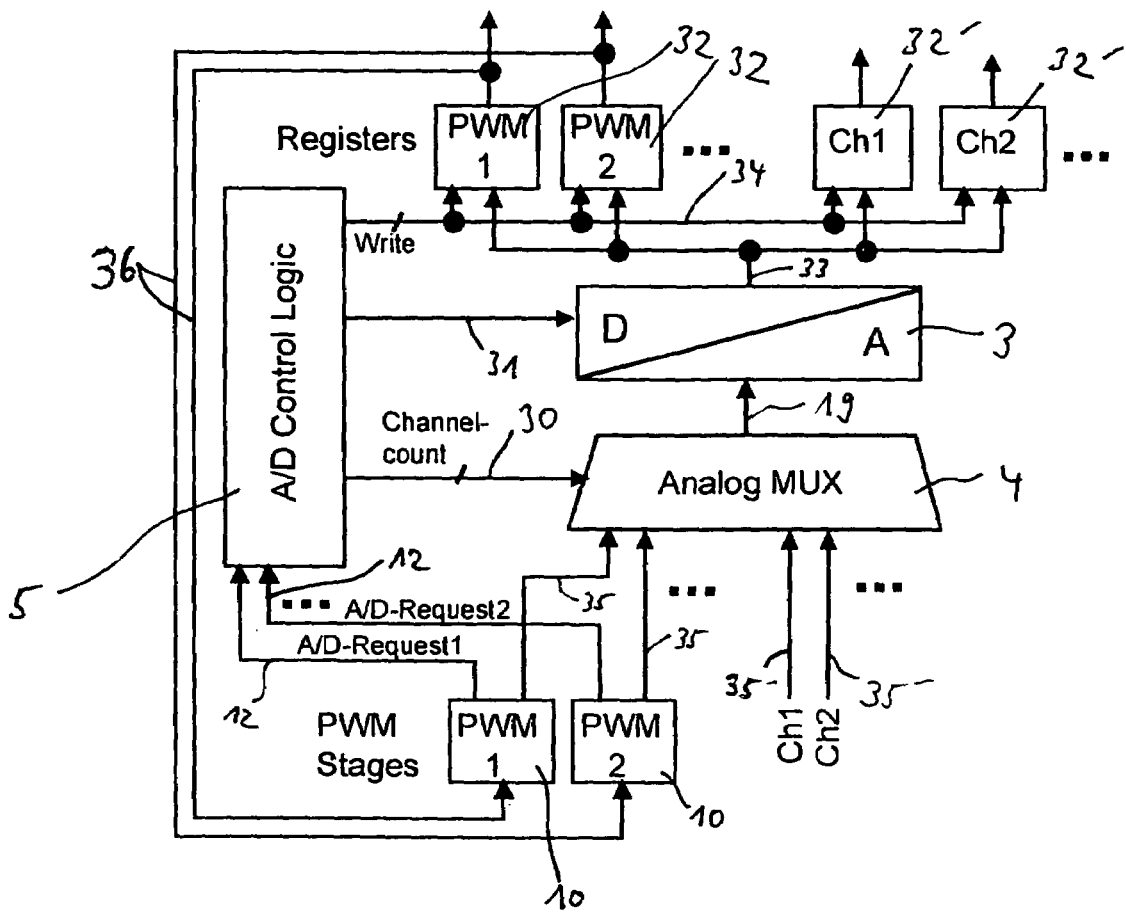
FIG. 3 is a circuit arrangement of the invention comprising an A/D converter, stages actuated by pulse-width modulation, and additional A/D converter channels.

The mode of function of the circuit arrangement of the invention in FIG. 3 is initially described with reference to FIG. 1. The current I (partial image b), reference numeral 26, in an inductive load, e.g. coil of a valve or a motor, is adjusted by means of pulse-width-modulated actuation of a FET 7 (FIG. 2). The current in the load is regulated by current feedback. Partial image a) represents the course of an actuating signal 14 for a driver stage. The actuating pulse 37 has a square shape. The duration of a period of actuation $T_{PWM}$ which is equal in all driver stages (joint period), is composed of the time $t_{ON}$ (reference numeral 1) and $t_{OFF}$ so that $T_{PWM}=t_{ON}+t_{OFF}$ applies. The duty cycle is defined as $dc=t_{ON}/T_{PWM}$. The load is actuated during $t_{ON}$, the actuating transistor is in a non-conductive state during $t_{OFF}$, and a re-circulation current flows via a current path provided for this purpose and formed by a diode or an active circuit. With a given value of dc, $t_{ON}=dc*T_{PWM}$ results for the on-time of the control transistor. The re-circulation time is calculated according to $t_{OFF}=(1-dc)*T_{PWM}$. The course of the curves is illustrated in an ideal fashion in FIG. 1. The current through the coil is approximately linear when the time constant τ of the coil is long compared to the period $T_{PWM}$.

Partial image b) shows that the coil current should be measured at a moment before the edge 37 of the actuating pulse 37. The mean value of the coil current can be determined in an especially favorable manner when current measurement takes place as precisely as possible at time $t_{ON}/2$.

FIG. 2 shows an example of a driver stage for actuating an inductive load. Actuation of the load may occur by way of a low-side driver or a high-side driver (not shown). A measuring resistor 2 is arranged in the main path of the Main-FET 7 in partial image a), from which resistor 2 the current-proportional voltage $U_S$ can be tapped at terminals 8 and 9. In partial image b) the current is used for current measurement by way of a separate current path of a sense-FET 7'.

Appropriately, the coil current is measured with the driver switched on, meaning during the time $t_{ON}$, in particular at a moment that lies as exactly as possible in proximity to half the on-time $t_{ON}/2$. This arrangement is advantageous because the current value determined at this point of time corresponds in approximation to the mean value 25 of the coil current. Alternatively it is possible to determine the coil current also during the re-circulation time $t_{OFF}$ by way of a re-circulation driver, e.g. roughly at the moment $t_{OFF}/2$.

FIG. 3 explains an example for a circuit arrangement of the invention, according to which exactly one A/D converter is used for current measurement. Said arrangement comprises several driver stages 10 actuated in pulse-width modulation as well as a defined number of additional A/D converter channels 35 and 35' and an A/D converter 3 with a preceding analog multiplexer 4. Actuating logic 5 is connected to the driver stages 10 and receives from them request signals by way of signal lines 12. Logic 5 controls the A/D converter by way of line 31. Line 30 is used to control the multiplexer 4. Analog signals are sent to the A/D converter by way of input 19. The digital output of A/D converter 33 leads to memory locations 32 and 32' storing the determined current values or converted values of channels 35, 35' (Ch1, Ch2). In addition, logic 5 includes a write line 34 allowing the control of the access of digital output 33 of the A/D converter to the current memory locations 32, 32' (de-multiplexer). From memory locations 32 with current values of the driver stages, data lines 36 extend to the driver stages 10 and transmit digitized current signals.

It is preferred to subdivide the period $T_{PWM}$ into time slices 11 of equal length (see FIG. 4), and one of the time slices produced is associated with each driver stage 10. The number of the driver stages is designated by k. In this case, $t_{time-slot}=(1/k)*T_{PWM}$ applies to the width of a time slice $t_{time-slot}$. This solves the problem that with a simultaneous start of all actuating pulses in a short duty cycle dc, the time span $t_{ON}$ available for the current measurement would be too short to execute all current measurements within the time available.

Each driver stage is enabled at the commencement of its time slice so that the driver stages are not enabled at the same time. However, this does not exclude a driver stage from being enabled longer than the corresponding time slice, e.g. in such a way that the actuating signal of the driver is always modulated 100%. Current measurement by means of the A/D converter will occur when a driver stage sends a request signal (request) to the A/D converter by way of signal line 12 associated with said driver stage, said A/D converter executing the A/D conversion upon receipt of a request signal either instantaneously or at a later point of time.

Figure 4:
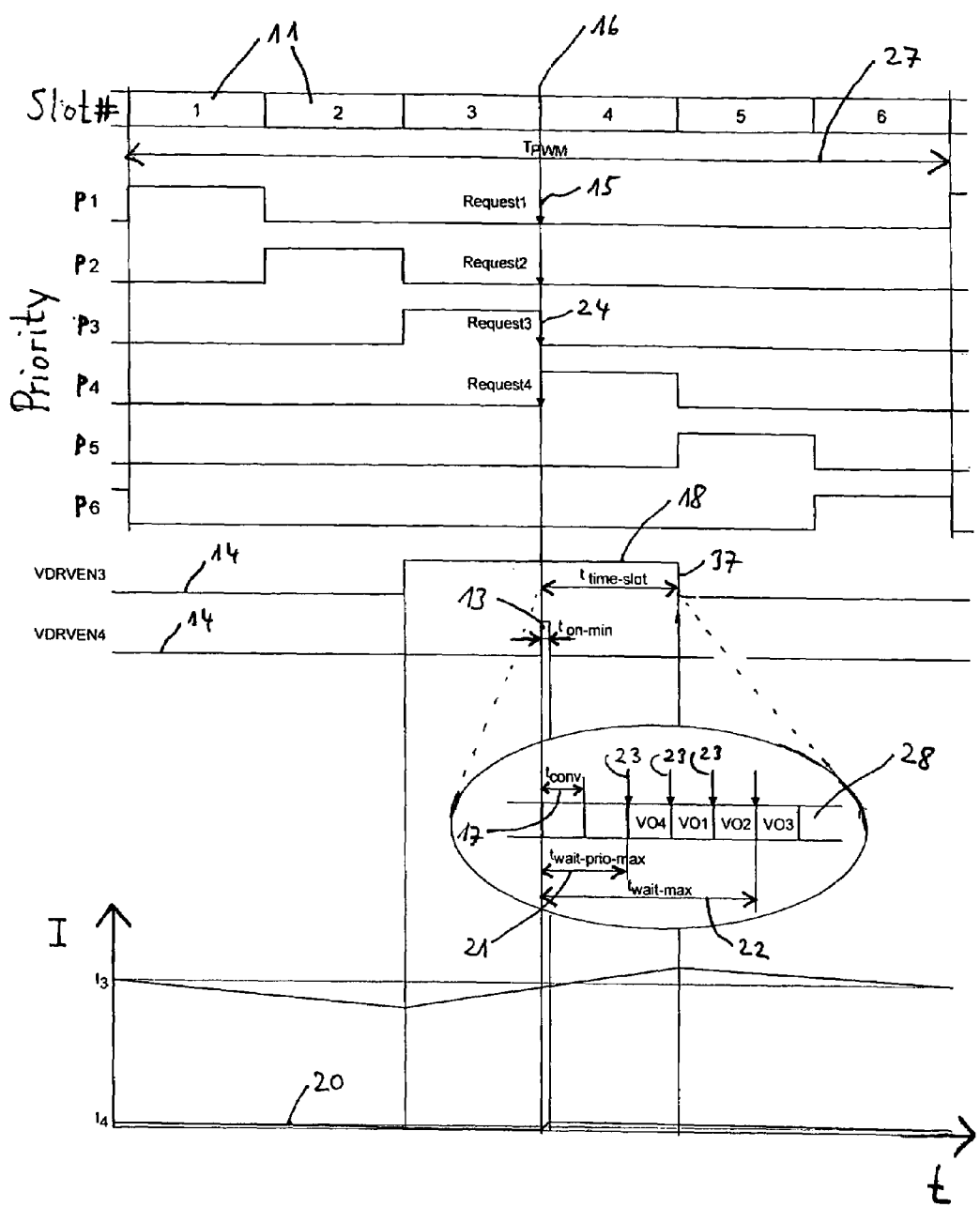
FIG. 4 shows a diagram with different signal variations in the circuit arrangement according to FIG. 3.

Logic 5 acts such in processing the request signals that the driver stage has highest priority at a time lying within the time slice associated with it, meaning it is processed as first. FIG. 4 shows six time slices 11 for the driver stages Nos. 1 to 6. Associated with each driver stage is one of signals P1 to P6, with the respective signal being set to 'high' exclusively in the period of an associated priority. It may be expedient especially for processing signals with a short duty cycle to immediately interrupt (Interrupt) a request (e.g. a current A/D conversion) as in the case explained above. It is, however, also possible to omit the processing of signals with a particularly short duty cycle, to initially complete the present measurement and process immediately thereafter the measurement of the driver stage with the instantaneous priority.

Upon expiry of the time slice of a driver stage, the corresponding stage will lose its priority. If a driver stage having no priority nevertheless produces a request signal, the request to the A/D converter related to the request signal is input into a queue (Queue) by a checking device 5. This queue is processed when the driver stage having instantaneously highest priority either has terminated its current measurement, or no current measurement is necessary. In processing the queue, the request received as first is processed as first (First-Come-First-Serve). When the queue has been finished because the current measurement requests have been processed, the A/D converter may be utilized for measuring other signals. Thus, for example, a continuous mode may be provided in which the other signal channels 35, 35' that are not allocated to PWM stages are processed in a fixed order.

The above-described concept for current measurement and current control has a bottom limit ($t_{on-min}$) with respect to its shorter adjustable duty cycle (dc). When dc is smaller than $t_{on-min}$, the time available is no longer sufficient for current measurement. According to the invention, it is therefore preferred to lower the bottom limit for the duty cycle in that at least with small values of dc, current measurement is performed by one memory element per stage so that the current value of the stage is available for the A/D conversion also for a longer period of time. A memory element may be realized in a particularly simple manner by a capacitor that maintains the voltage applied to the output at the moment of disabling of the driver stage.

Referring to FIG. 4 two critical cases during the operation of the circuit arrangement in FIG. 3 are explained in detail. Time interval 27 ($T_{PWM}$) is subdivided into six time intervals 11.

Extreme Case 1

End stage No. 4 is activated by signal pulse 13 (VDRVEN4) with a very small value of dc (roughly 5%) that simultaneously represents a bottom limit value for the circuit of the example. The width of the signal pulse is referred to by $t_{on-min}$. The testing time of the A/D converter or the sample time thereof must now be chosen such that at least one A/D conversion or the sampling of the current value is terminated within the time $t_{on-min}$. Otherwise, instability of the control may be caused. The testing time of the A/D converter may be assessed in the way described hereinbelow.

Extreme Case 2

The second case deals with the maximum possible number of requests produced at the same time. As will be shown in the following, with six time slices maximally three requests without priority and one request with priority are possible. Simultaneous requests without priority are obtained when driver stage No. 1 is activated with a 100% dc for the duration $t_{ON}=T_{PWM}$, meaning for the maximum possible time, driver stage No. 2 is activated with a dc of 2/3*100% and driver stage No. 3 with a dc of 1/3*100%. A request with priority will now produce the signal 13 in the time slice 4 which has been described already hereinabove with respect to the extreme case 1. For the sake of clarity, only the actuating signals of stages Nos. 3 and 4 but not the signals of stages Nos. 1 and 2 are plotted in FIG. 4. Thus, reference numerals 18 and 13 designate the actuating signals of the third and fourth stage (VDRVEN 3 and 4). In the bottom part of FIG. 4 the current variations of the driver stages Nos. 3 and 4 are qualitatively illustrated in addition (13 and 14). The pulse commencement of the actuating signal 13 as well as the pulse commencement of the actuating signals No. 1 (point of time of start is optional), No. 2, and No. 3 is chosen such that $t_{on}/2$ will lie at moment 16. At moment 16, a current measurement request (arrow 15) is produced e.g. by stage No. 1, yet this stage has already lost its priority. Another request is produced in the event of a request by stage No. 4 which has the priority. Thus, there are four requests that are meant to be processed by the A/D converter in the order 28. After processing of driver stage No. 4 (VO4) has terminated, the queue is filled with a maximum of three (other) requests (VO1, VO2, VO3). Therefore, it is necessary to rate the parameters of the circuit arrangement in such a manner that the requests being processed can still be processed within the full time slice No. 4 because then the driver stage No. 3 is disabled.

When a total number of six drivers is made the basis, there will be maximally four synchronous requests for driver stages in the extreme case when all driver stages are activated, as mentioned already. This does not exclude that also the stages Nos. 5 and 6 that are likewise activated under certain circumstances can produce further request signals. It follows, however, from logical considerations that these requests cannot be placed at moment 16, where the requests of stages Nos. 1 to 4 may coincide, and for this reason usually have already been processed or will still be produced at moment 16.

Estimation of the Time Required for Current Measurement

To calculate the time needed for a measurement operation, the time requirement of the A/D converter ($t_{conv}$) must generally be considered, but also the transient effect of the measuring circuit is included in the reading time required which is designated by $t_{sample}$ (reference numeral 17 in FIG. 4) in the following. To reduce the time required by the A/D converter, it is especially suitable to use a type of A/D converters that initially read in a test value and then intermediately store it (sample and hold, pipelining) so that a subsequent value is read in already at the input, while the present value is still in the process of conversion. The clocked sampling (polling) of the A/D converter input 19, represented by arrows 23, causes another time delay or insecurity. Due to the clocked operation, the polling moments normally do not coincide with the moments of the current measurement requests. The result is a time delay that is referred to as $t_{polling}$ in the following. The maximum deviation to be assumed is produced when a current measurement request occurs immediately after a polling operation so that $t_{polling}$ can adopt the value $t_{conv}$ as maximum. Therefore, $T_{polling-max}=t_{conv}$ applies.

The maximum waiting time between the request and sampling of the prioritized stage (extreme case 1, see reference numeral 21) is designated by $t_{wait\text{-}prio\text{-}max}$) and calculated according to $$t_{wait\text{-}prio\text{-}max} = t_{polling\text{-}max} + t_{sample} = 2 * t_{conv}.$$

In order that the current of a driver stage is still measured in time, first it must be demanded that the action of sampling by the A/D converter is terminated still during the interval $t_{on}$. Therefore, the relation $$t_{wait\text{-}prio\text{-}max} \leq t_{on\text{-}min}$$

must apply, where $t_{on\text{-}min}$ is the smallest possible value for $t_{on}$.

An example suitable for the calculation to be performed herein is the extreme case 1 explained hereinabove with short $t_{on}$ (pulse 13, driver stage No. 4). Curve 20 depicts the current caused hereby in the load. The current request takes place directly after moment 16 at moment $t_{ON}/2$.

The second extreme case that has already been explained by way of the example of driver stage No. 3 determines another limit condition for the time requirement of the A/D converter. As explained already, a maximum possible number of requests prevail in this case. The maximum waiting time between a request and its processing by the A/D converter, which is designated by $t_{wait\text{-}max}$ in the following, is marked by the double arrow 22 in the Figure. Consequently $t_{wait\text{-}max}$ is calculated according to $$t_{wait\text{-}max} = t_{polling\text{-}max} + t_{sample} + 3 * t_{conv} = 5 * t_{conv}.$$

In general, the relation is $$t_{wait\text{-}max} = t_{polling\text{-}max} + t_{sample} + \lfloor k/2 \rfloor * t_{conv}.$$

As a second boundary condition $$t_{wait\text{-}max} \leq t_{time\text{-}slot} \text{ applies.}$$

It is possible to reduce $t_{wait\text{-}prio\text{-}max}$ by $1 * t_{conv}$ by interrupting a current conversion (interrupt) described hereinabove. No variation of $t_{wait\text{-}max}$ is caused thereby.

The ripple mark 29 (see FIG. 1) of the current in the transient condition is determined by the coil's discharge during the $t_{off}$ time. Thus, it depends on the time constant of the discharge (and hence on the L of the coil) as well as on the present duty cycle. The ripple permits detecting the rise in current during the $t_{ON}$ time. It can be calculated herefrom by what rate the current changes during $t_{wait\text{-}prio}$ or $t_{wait}$. The result is a standard of inaccuracy that must be tolerated as caused by the method of the invention.

The invention claimed is:

1. A circuit arrangement for controlling electrical current in loads by pulse width modulation, comprising at least two driver stages (10) provided for actuation of the loads and one or more current measuring devices (3), the number of current measuring devices (3) being smaller than the number of the driver stages, wherein at least one multiplexer (4) is provided conducting current measurement signals by way of the load current in the driver stages to one or more of the current measuring devices in dependence on one or more control signals (30, 31) for the multiplexer, wherein the control signals are produced by a checking device (5),
wherein the checking device comprises a de-multiplexer output (34) which allocates the digital output (33) of an A/D converter to current memory locations (32, 32').

2. The circuit arrangement as claimed in claim 1, wherein the driver stages (10) send request signals to the checking device (5) by way of request lines (12).

3. The circuit arrangement as claimed in claim 1, wherein the checking device comprises a memory storing request events initiated by request signals.

4. A method for current measurement with one or more current measuring devices (3), and two or more driver stages (10),
wherein the currents flowing in the driver stages are measured in each driver stage and the driver stages are actuated by means of individual control signals (14) for pulse width modulation of the load current flowing in the driver stage,
wherein the moment of the current measurements is controlled by an organized chronological order, and
wherein the control signals of the driver stages have one joint period (27), said period being subdivided into several time slices (11) and each time slice being associated with exactly one driver stage (10).

5. The method as claimed in claim 4, wherein current measuring requests (15, 24) associated with the driver stages are produced, and current measurement takes piece in response to a request.

6. The method as claimed in claim 4, wherein a driver stage is enabled only within a time slice associated with it (13, 18), especially at the beginning of said time slice.

7. The method as claimed in claim 4, wherein the organized allocation memorizes current measurement requests intended for individual driver stages, and processes the current measurements on account of current measurement requests according to a fixed order or an order determined by sorting.

8. The method as claimed in claim 7, wherein a current measurement request of a driver stags is processed as first within the time slice associated with the driver stage.

9. The method as claimed in claim 8, wherein a current measurement request of a driver stage, which is not allocated to the time slice that is instantaneously passed, is processed only when former current measurement requests of driver stages that do not belong to the time slice have already been processed.

10. The circuit arrangement as claimed in claim 8, wherein a current measurement request of a driver stage outside the time slice associated with the driver stage that cannot be processed immediately is stored in a memory, and processing of the memorized requests is executed in a chronological order that takes into consideration the moment of the edge (37) of the actuating pulses.

* * * * *